July 5, 1932.　　　W. N. SPANGLER　　　1,865,595
APPARATUS FOR CHARGING STORAGE BATTERIES Filed July 8, 1930

INVENTOR
W. N. Spangler,
BY
His ATTORNEY

Patented July 5, 1932

1,865,595

UNITED STATES PATENT OFFICE

WILLIAM N. SPANGLER, OF PHILADELPHIA, PENNSYLVANIA

APPARATUS FOR CHARGING STORAGE BATTERIES

Application filed July 8, 1930. Serial No. 466,398.

My invention relates to apparatus for charging storage batteries, and has for an object the provision of novel and improved means for increasing the rate of charge of a storage battery after the battery has been called upon to furnish current to a load.

I will describe two forms of apparatus embodying my invention, and will then point out the novel features thereof in claims.

Figure 1:
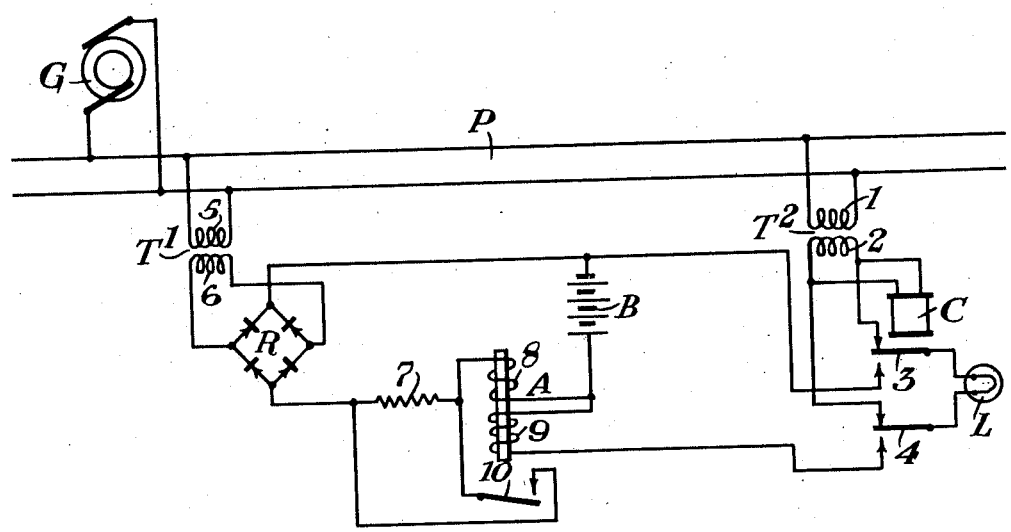
Figure 2:
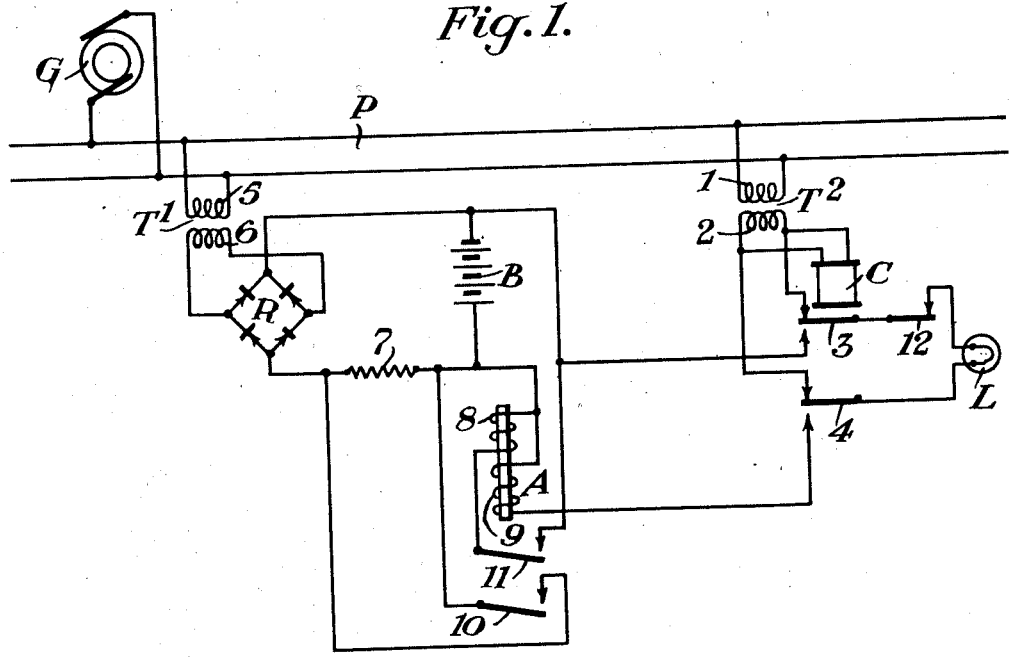

In the accompanying drawing, Fig. 1 is a diagrammatic view showing one form of apparatus embodying my invention. Fig. 2 is a diagrammatic view showing a modification of a portion of the apparatus shown in Fig. 1 and also embodying my invention.

Similar reference characters refer to similar parts in each of the views.

Referring first to Fig. 1, the reference character L designates a load, which, as here shown, is an electric lamp, and which load is normally supplied with alternating current from a generator G. A storage battery B is constantly supplied with a small charging current from the generator G through a rectifier R, and is used to furnish current to the load L when the source of alternating current supply from the generator G fails.

The generator G is connected with a transmission line P, and current is supplied from this line to the load L through a transformer T², the primary 1 of which is connected with the transmission line P. The secondary 2 of this transformer is normally connected with the load L through the front contacts 3 and 4 of a power-off relay C, the winding of which is connected across the transformer secondary 2. When relay C becomes deenergized, due to a failure of alternating current from the transmission line P, the front contacts of this relay will open, thereby disconnecting the load L from transformer T², and the back contacts of this relay will close to connect the load L with the battery B through a winding 9 of a relay A.

The primary 5 of a transformer T¹ is also connected with transmission line P, and the secondary 6 of this transformer is connected with the input terminals of a full-wave rectifier R. The output terminals of rectifier R are connected with the battery B, through a resistance 7 and a winding 8 of relay A, so that battery B is constantly supplied with a small charging current as long as transmission line P is supplied with power. This charging current is what is ordinarily known as a trickle charge, in that it is just sufficient to maintain the battery in fully charged condition when the battery is not connected with a load.

Relay A is provided with a front contact 10 which is normally open, but which, when closed, completes a low resistance shunt around the current-limiting resistance 7 in the battery charging circuit. The relay A is so proportioned that the trickle charge current in winding 8 is not sufficient to close contact 10, but that when battery B is connected with the load L the output current of the battery in winding 9 is sufficient to close the contact 10. When contact 10 is once closed, it will be held closed by the battery charging current in winding 8 even though the output current winding 9 becomes deenergized. Usually the winding 8 will be a relatively high resistance winding, and the winding 9 will have relatively low resistance.

The operation of the apparatus is as follows: Normally, the power-off relay C is energized, so that the load L is connected with transformer T² and the battery B is disconnected from the load. Relay A is open, so that the battery is receiving a trickle charge. When the supply of alternating current to the transmission line P fails, relay C will open, thereby connecting the load L with the battery B and at the same time energizing relay A to close contact 10. Then when power is again supplied to the transmission line P, relay C will become energized to again connect the load L with the transformer T², but contact 10 of relay A will remain closed, so that the charging rate of battery B will be increased to compensate for the current which has been drawn from the battery to operate the load L. This condition will continue until contact 10 of relay A is opened manually.

Apparatus embodying my invention is particularly well adapted for use in connection with railway signaling wherein the load L may, for example, be a signal lamp.

The apparatus shown in Fig. 1 is suitable for use in connection with a continuous load, but if the load is intermittent, the apparatus cannot be relied upon to function properly under all conditions, because if the load circuit should be open when power is restored to the transmission line P, relay A would be deenergized and the charging rate of battery B would not be increased. In Fig. 2 I have shown a modified form of apparatus which is suitable for use in connection with an intermittent load. In this view the circuit for lamp L includes a contact 12, and when the lamp L is a signal lamp for a railway signaling system the contact 12 may be the usual approach lighting contact whereby the lamp L is lighted only when a train is approaching. In this view the circuit for winding 9 of relay A is the same as in Fig. 1, but the circuit for winding 8 of this relay is from the lower terminal of battery B, through winding 8 and front contact 11 of relay A to the upper terminal of battery B. Except for the differences just pointed out, the apparatus shown in Fig. 2 is the same as that shown in Fig. 1.

The operation of the apparatus shown in Fig. 2 is as follows: In the event of failure of the supply of power to the transmission line P, relay C will open and will connect the load L with the battery B through winding 9 of relay A. The closing of contact 11 of relay A will connect winding 8 with battery B so that relay A will then remain closed until its armature is manually opened. It follows that when power is restored to the transmission line P, the resistance 7 will be shunted so that the battery B will be charged at a relatively high rate, and this will occur regardless of whether or not contact 12 is closed at the time that the power is restored to the transmission line.

Railway signaling systems are carefully watched by maintainers, and it is understood that upon each inspection of the battery charging equipment, the maintainer will manually open the armature of relay A if he finds it closed, or that he will determine from the condition of the battery B whether or not the battery has been restored to its full charge, and will be governed accordingly in his manipulation of the armature of relay A.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a storage battery, a source of alternating current, a load normally connected with said source, means responsive to failure of current from said source for connecting said load with said battery, a relay having two windings one of which is included in the output circuit of said battery, a charging circuit for said battery including said source and a rectifier as well as a resistance and the other winding of said relay, and a low resistance shunt around said resistance including a front contact of said relay.

2. In combination, a storage battery, a source of alternating current, a load normally connected with said source, means responsive to failure of current from said source for connecting said load with said battery, a relay having two windings one of which is included in the output circuit of said battery, a circuit for the other relay winding including said battery and a front contact of the relay, a charging circuit for said battery including said source and a rectifier as well as a resistance, and a low resistance shunt around said resistance including a front contact of said relay 3. In combination, a storage battery, a source of alternating current, a load normally connected with said source, means responsive to failure of current from said source for connecting said load with said battery, a closed charging circuit for said battery including said source and a rectifier, a relay having a winding included in the output circuit of said battery whereby the relay becomes energized upon the flow of current from said battery means for subsequently keeping said relay energized after current is again supplied by said source, and means effective while said relay is energized to increase the rate of charge of said battery.

4. In combination, a storage battery, a source of alternating current, a load normally connected with said source, means responsive to failure of current from said source for connecting said load with said battery, a closed charging circuit for said battery including said source and a rectifier, a relay having a winding included in the output circuit of said battery whereby the relay becomes energized upon the flow of current from said battery, means for subsequently keeping said relay energized after current is again supplied by said source, a resistance included in the charging circuit for said battery, and a low resistance shunt around said resistance including a front contact of said relay.

In testimony whereof I affix my signature.

WILLIAM N. SPANGLER.